(12) United States Patent  
Alexandrov et al.

(10) Patent No.: US 8,325,896 B2  
(45) Date of Patent: Dec. 4, 2012

(54) SYSTEM AND METHOD FOR DYNAMIC AUDIO CONFERENCE CALL CONFIGURATION AND MANAGEMENT

(75) Inventors: Albert Alexandrov, Goleta, CA (US); Allan Knight, Goleta, CA (US); Krishna Ramachandran, Santa Barbara, CA (US); Chris Scheiman, Goleta, CA (US); Florian Winterstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 988 days.

(21) Appl. No.: 12/275,057

(22) Filed: Nov. 20, 2008

(65) Prior Publication Data

US 2010/0124321 A1 May 20, 2010

(51) Int. Cl.
*H04M 3/42* (2006.01)

(52) U.S. Cl. ............... 379/202.01; 379/203.01; 455/416

(58) Field of Classification Search ............. 379/202.01, 379/201.01, 203.01, 204.01; 709/227, 204; 455/416

See application file for complete search history.

(56) References Cited

U.S. PATENT DOCUMENTS

| | | | |
|---|---|---|---|
| 6,178,237 B1 * | 1/2001 | Horn | 379/202.01 |
| 2002/0188731 A1 * | 12/2002 | Potekhin et al. | 709/227 |
| 2003/0223562 A1 * | 12/2003 | Cui et al. | 379/202.01 |
| 2007/0239885 A1 | 10/2007 | Vadlakonda et al. | |

* cited by examiner

*Primary Examiner* — Thjuan K Addy  
(74) *Attorney, Agent, or Firm* — McDermott Will & Emery LLP

(57) ABSTRACT

A new approach is proposed that contemplates audio conference systems and methods to expand the capacity a conference call by utilizing both a mixing engine that enables a first group participants to be able to both listen to and speak at the conference call, and a broadcast engine that broadcasts the conference call to a second group of participants who are only interested in listening to, but not speaking at the conference call. During the conference call, participants at the mixing engine and the broadcast engine can be dynamically adjusted.

38 Claims, 3 Drawing Sheets

SYSTEM AND METHOD FOR DYNAMIC AUDIO CONFERENCE CALL CONFIGURATION AND MANAGEMENT

BACKGROUND

An audio conference call is a telephone call between more than two callers or users (referred to herein as participants) at geographically distributed locations, which allows each participant to be able to speak to, and listen to, one or more other users simultaneously. A conference call among a plurality of participants can be conducted via a conference bridge or centralized server, which connects numerous endpoint devices associated with the participants using appropriate communication protocols and mixes the various incoming voice streams from the plurality of participants either at endpoint devices or at the conference bridge. Enabling each of the plurality of participants to the conference call to both listen to and speak to each other demands fair amount of processing power of the conference bridge. On the other hand, enabling a conference participant to only listen to, but not speak at the conference call (under the scenario where many participants may be only interested in attending to listen to but not speak), would require much less processing power. Consequently, a conference bridge/server with fixed processing power can have only a limited number of conference participants if all participants are enabled to speak, but the same bridge with the same processing power can have a much higher number of participants if at least a portion of them are not interest or not allowed to speak at the conference call.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates audio conference systems and methods to expand the capacity a conference call by utilizing both a mixing engine that enables a first group participants to be able to both listen to and speak at the conference call, and a broadcast engine that broadcasts the conference call to a second group of participants who are only allowed to listen to, but not speak at the conference call. During the conference call, participants at the mixing engine and the broadcast engine can be dynamically adjusted. For a non-limiting example, a participant in the second group who wants to speak at the conference call can be moved from the broadcast engine to the mixing engine, while a participant in the first group who has been silent for a long time during the conference call can be removed from mixing engine, possibly to the broadcast engine. Since broadcasting a conference call to a participant requires much less physical resource than enabling a participant to be able to both listen to and speak at the conference call, the size of the second group participants can be much (e.g., 10 times) larger than the size of the first group of participants. Such approach is especially suited for a large group event, such as a teleconferencing of a corporate meeting over multiple geographically diversified locations, at which many would attend just to listen while only a few would speak.

Figure 1:
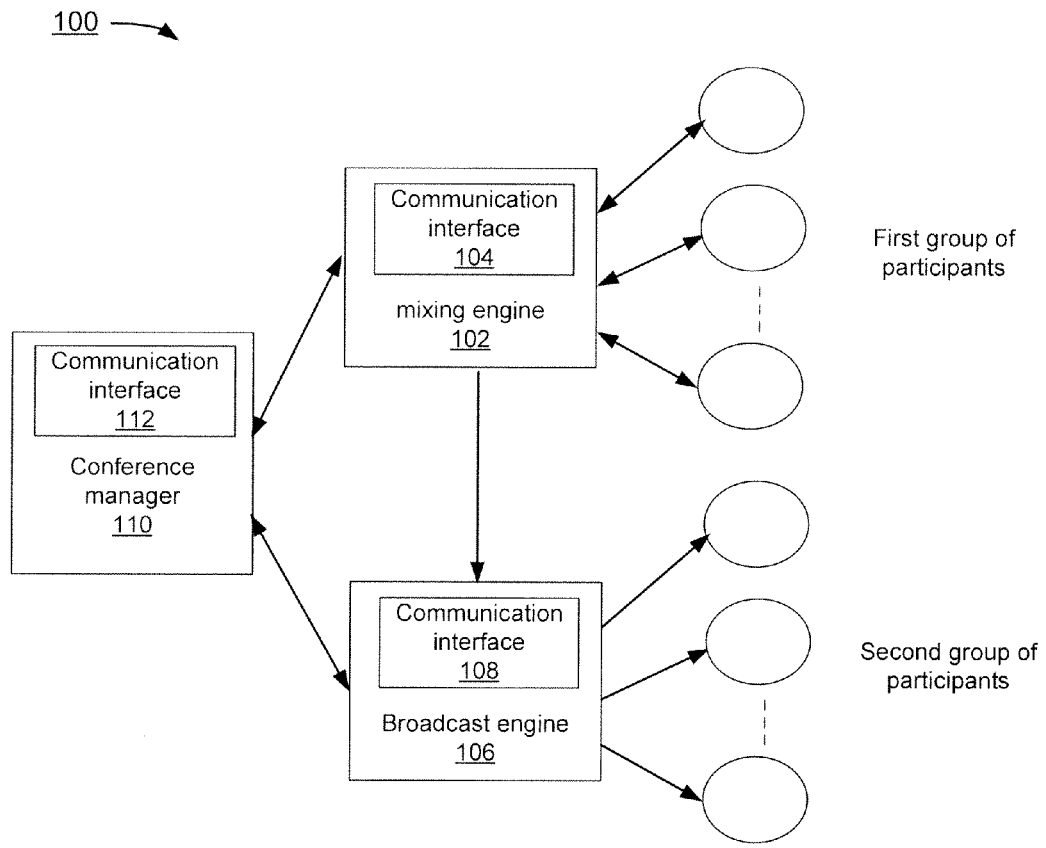
FIG. 1 depicts an example of a system diagram of an audio conference system to support dynamic conference call configuration and management.

FIG. 1 depicts an example of a system diagram of audio conference system (bridge) 100 to support dynamic conference call configuration and management. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the audio conference system 100 includes a mixing engine 102, a broadcast engine 106, and a conference manager 110, each also includes at least a communication interface 104, 108, and 112.

As used herein, the term "engine" or "manager" refers to a software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the engines and manager can run on one or more hosting devices or hosts (not shown). Here, a host can be a computing device, a communication device, s storage device, or any electronic device capable of running a software component. For non-limiting examples, a computing device can be but is not limited to, a laptop PC, a desktop PC, a tablet PC, an iPod, a PDA, or a server machine. A storage device can be but is not limited to a hard disk drive, a flash memory drive, or any portable storage device. A communication device can be but is not limited to a mobile phone.

In the example of FIG. 1, the mixing engine (or conference/mixing bridge) 102 is operable to provide conferencing services over a communication network by establishing a conference call among a first group of participants, receiving and mixing communication (voice and/or data) signals generated by each of the group of participants, and providing the mixed signals to each of the group of participants. Here, each of the first group of participants is able to both simultaneously listen to and to speak to the rest of the participants in the group during the conference call. Each of the first group of participants may represent a group of people gathering at a geographically distributed location, such as a conference room or office, where everyone in the group can listen to or speak to the conference call via a telephony endpoint device. Here, the term "telephony endpoint device" includes but is not limited to any device having one or more of telephonic and data capabilities, e.g. a PSTN telephone, a PDA, a Voice over IP (VoIP) device, a computer with a CTI (Computer Telephony Interface), and the like equipped with a microphone.

In some embodiments, the mixing engine 102 can connect to one or more additional mixing engines, wherein each of the one or more other mixing engines enables a group of participants to listen to and to speak during the same conference call. Since enabling each participant to both listen to and speak at the conference call puts a burden on the resource of the mixing engine 102, such as its processing power, memory, and bandwidth, each mixing engine can only handle a limited number of participants at any moment. When there is an "overflow" of participants interested in joining a conference call, more than one mixing engines may be needed to accommodate such interest. Here, the one or more additional mixing engines may be connected to the mixing engine 102 in any shape, form, or fashion necessary to enable the group of participants at each of the additional mixing engine to participate in the same conference call.

In the example of FIG. 1, the broadcast engine 106 connects to the mixing engine 102 as one of the participants to the conference call and broadcasts the conference call to a second group of participants, wherein each of the second group of participants is enabled to merely listen to, but not to speak, during the conference call. Like the first group of participants, each of the second group of participants may represent a group of people gathering at a geographically distributed location, such as a conference room or office where everyone in the group can listen to or speak to the conference call via a telephony endpoint device.

In some embodiments, the broadcast engine 106 may adopt multicast protocol for communication between a single sender and multiple receivers on a network. Multicast is a network addressing method for the delivery of information (voice, data, or other types of streaming media) to a group of destinations simultaneously using the most efficient strategy to deliver the messages over each link of the network only once, creating copies only when the links to the multiple destinations split (typically network switches and routers). The implementation of the multicast concept occurs on the IP routing level, where routers create optimal distribution paths for data grams sent to a multicast destination address spanning tree in real-time.

In some embodiments, the mixing engine 102 connects to more than one broadcast engines, wherein each of the broadcast engines enables a group of participants to listen to the conference call. Like the mixing engine 102, each broadcast engine can only handle a limited number of participants at any moment due to the burden on its available resource posed by each participant, even though such burden is significantly less than that posed on the mixing engine 102 by each of its participant. Thus, more than one broadcast engines may still be needed when necessary to accommodate an overflow of participants. In addition, each broadcast engine may also connect to one or more other broadcast engines in any shape, form, or fashion necessary to enable the group of participants at each of the additional broadcast engine to listen to the same conference call.

In the example of FIG. 1, the conference manager 110 monitors activities of the first and second groups of participants during the conference call at the mixing engine 102 and the broadcast engine 106, respectively. Here, such monitored activities include but are not limited to, Number of the first and second group of participants of the conference call at the mixing engine and the broadcast engine, respectively.

Starting time and the duration of the conference call.

Starting time and the duration of the each of the first and second group of participants at the conference call.

Frequency and duration of the each of the first group of participants who speaks at the conference call.

Elapsed time of lapse since each of the first group of participants last spoke at the conference call.

In the example of FIG. 1, the conference manager 110 is configured to enable a participant to join the conference call at either the mixing engine 102 or the broadcast engine 106 by, for a non-limiting example, dialing into a special telephone number and then entering a participation or access code. Based on the participation code entered by the participant, the conference manager 110 will add the participant to either the mixing engine 102 where the participant can both listen and speak or to the broadcast engine 106 where the participant can only listen to the conference call, accordingly. Alternatively, each participant may join the conference call via a Web-based client application or interface running on a local computing device.

In the example of FIG. 1, the conference manager 110 manages the first and the second group of participants associated with the mixing engine and the broadcast engine, respectively. More specifically, the conference manager 110 is operable to accept and process a request to dynamically adjust configurations of at least one of the first and the second group of participants by performing at least one of the following:

Adding a new participant to the first group of participants who are able to both listen to and speak at the conference call.

Removing an existing participant from the first group of participants at the conference call.

Moving a participant in the second group of participants to the first group of participants so that the participant is able to both listen to and speak at the conference call.

Moving a participant in the first group of participants to the second group of participants so that the participant is only able to listen to, but not to speak at the conference call.

Adding a new participant to the second group of participants who can only listen to the conference call.

Removing an existing participant from the second group of participants at the conference call.

All such changes in the configurations of the first and/or the second groups of participants happen during the ongoing conference call transparent to the rest of the participants to the conference calls, who continues the conference call without any notice or interruption by such changes.

In the example of FIG. 1, the conference manager 110 is operable to set the capacity of the mixing engine 102 as the maximum number of the first group of participants who are able to both listen to and speak at the conference call via the mixing engine 102, based on the resources (e.g., processing power, memory capacity, and network bandwidth) of the mixing engine 102. The conference manager 110 may also take other factors into consideration when setting the capacity of the mixing engine 102. For a non-limiting example, the capacity of the mixing engine 102 may be set lower than the maximum number when the mixing engine 102 is also taking on additional tasks such as communicating with other mixing engines and/or broadcast engines. Similarly, the conference manager 110 is operable to set a capacity of the broadcast engine 106 as the maximum number of the second group of participants that are able to listen to, but not to speak at the conference call. Since accommodating a participant who both speaks and listens to the conference call takes significantly more resource than broadcasting to a participant who only listens to the conference call, the capacity of the broadcast engine 106 can be much (multiple times) larger than the capacity of the mixing engine 102 having similar resources (processing power, memory, and network bandwidth) available.

In the example of FIG. 1, the conference manager 110 is operable to add a new participants to the mixing engine 102, or to move a participant in the second group of participants from the broadcast engine 106 to the mixing engine 102 to both listen to and to speak at the conference call upon request, if the number of the first group of participants is less than the capacity of the mixing engine. Conversely, the conference manager 110 is operable to remove a participant in the first group of participants at the mixing engine from being able to both listen to and to speak at the conference call under a set of scenarios, which include but are not limited to,

- When a new participant needs to speak at the conference call when the capacity of the mixing engine 102 is reached.
- The participant in the first group of participants at the conference call no longer participates (e.g., has been silent for a prolonged period of time) in the conference call.
- The participant behaves improperly during the conference call.

In some embodiments, the conference manager 110 automatically selects the participant in the first group of participants to be removed based on one or more of the following criteria.

- Priority of each of the first group of participants at the conference call. The lower the priority of a participant, the more likely it will be removed from the first group of participants.
- Duration of each of the first group of participants at the conference call. The longer one (except for the chair of the conference call) has stayed at the conference call, the more likely he/she has fully expressed his/her opinions, and it's time for him/her to give a new corner a chance to speak out.
- Frequency and duration of each of the first group of participants speaking at the conference call. Such frequency and duration are good indications of the active/involvement level of a participant at the conference. If a participant has not been actively engaged in the conference call, maybe he/she is no longer interested in participating in it and thus can be removed. A counter argument can be made that since the participant has not fully expressed him/herself, he/she should be allowed to stay in the conference call.
- Duration of silence since each of the first group of participants last spoke at the conference call.

In some embodiments, the conference manager 110 interactively communicates with the first group of participants at the mixing engine 102 when one of them needs to be removed and collects responses back from them within a certain period of time. Based on the collected responses from the first group of participants, the conference manager 110 may choose to remove the participant who volunteers to leave the conference call from the first group of participants or who does not intend to speak by voluntarily muting itself or otherwise restraining from speaking at the conference call. Alternatively, the conference manager 110 allows the first group of participants to vote one of them out of the conference call by proceeding to remove a participant from the first group of participants based on feedbacks from the rest of the first group of participants. Such feedbacks can be, not are limited to, ratings of the constructive/destructive nature of the participant's continued presence at the conference call.

Figure 2:
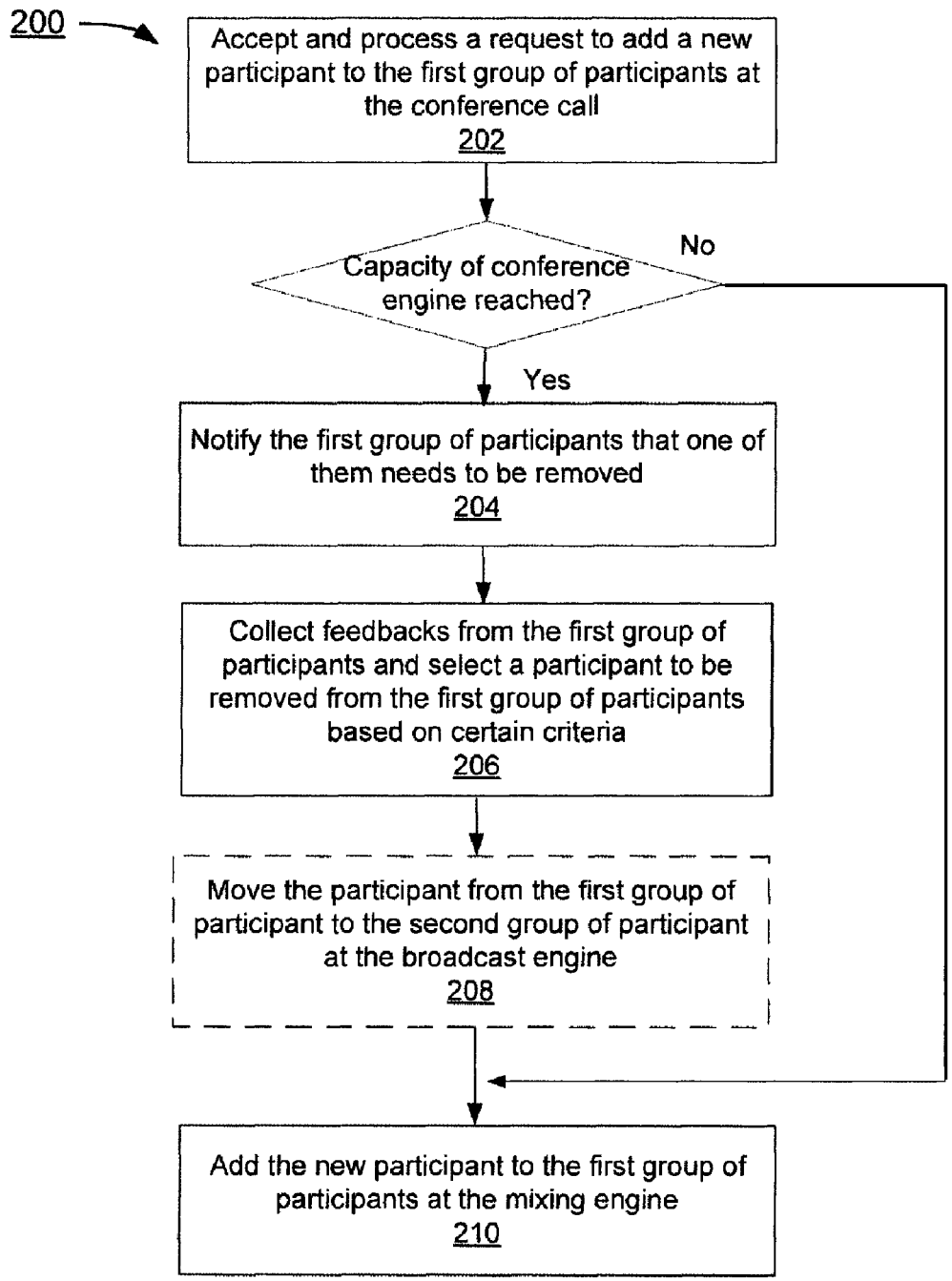
FIG. 2 depicts a flowchart of an example of a process to add a participant to both listen to and speak at the conference call.

FIG. 2 depicts a flowchart of an example of a process to add a participant to both listen to and speak at the conference call. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where a request for request to add a new participant to the first group of participants at the conference call is accepted and processed by the conference manager 110. Alternatively, the conference manager 110 may initiate its own action at adjusting the configurations of the first and/or second group of participants at the conference call without a triggering event. If the capacity of mixing engine has been reached, meaning adding the new participant to the conference call would require the removal of an existing one, the flowchart 200 continues to block 204 where the first group of participants currently at the conference are notified that one of them needs to be removed to make room for the new participants. The flowchart 200 continues to block 206 where feedbacks from the first group of participants are collected and a participant to be removed from the first group of participants is selected based on certain criteria discussed above. The flowchart 200 continues to block 208 where the participant to be removed from the first group of participant can optionally be added to the second group of participant at the broadcast engine 106 so that the participant can continue to listen to (but can no longer speak at) the conference call. The flowchart 200 ends at block 210 where the new participant is added to the first group of participants at the mixing engine 102 so that he/she can both listen to and speak at the conference call.

In some embodiments, the conference manager 110 may add a new participants to listen to, but not to speak at, the conference call if the number of the second group of participants is less than the capacity of the broadcast engine 106, similar to adding a new participant to the first group of participants at the mixing engine 102. Such action can either be triggered by a request or initiated by the conference manager 110 itself as it sees necessary and appropriate.

In some embodiments, the conference manager 110 may move a participant in the first group of participants from the mixing engine 102 to listen to the conference call only at the broadcast engine 106 if the number of the second group of participants is less than the capacity of the broadcast engine. Such move may be either be triggered under scenarios as discussed above, or initiated by the participant him/herself when he/she has done talking at the conference call or intends to yield his/her slot at the conference bridge 102 to another party.

In the example of FIG. 1, the mixing engine 102, the broadcast engine 106, and the conference manager 110 may reside on the same host running under the same software. Alternatively, the mixing engine 102, the broadcast engine 106, and the conference manager 110 may reside on different hosts, where the communication interface 104, 108, and 112 are software components that enables the mixing engine 102, the broadcast engine 106, and the conference manager 110 to communicate with each other as well as with the first and the second group of participants following certain communication protocols, such as TCP/IP protocol over a network (not shown). Here, the network can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

While the system 100 depicted in FIG. 1 is in operation, the mixing engine 102 establishes a conference call among the first group of participants by receiving and mixing communication (voice and/or data) signals generated by each of the group of participants and providing the mixed signals to each of the group of participants. Here, each of the first group of participants is able to both simultaneously listen to and to speak to the rest of the participants in the group during the conference call. The broadcast engine 106 connects to the mixing engine 102 as one of the participants to the conference call and broadcasts the conference call to a second group of participants, wherein each of the second group of participants is enabled to merely listen to, but not to speak, during the conference call. Both the mixing engine 102 and the broadcast engine 106 are designed so that each of the participants is able to join the conference call him/herself. The conference manager 110 monitors activities of the first and second groups of participants during the conference call at the mixing engine 102 and the broadcast engine 106, respectively. In addition, the conference manager 110 is operable to dynamically adjust configurations of at least one of the first and the second group of participants during the conference call by adding or removing a current participant from the mixing engine 102 or the broadcast engine 106, respectively, or moving a participant from the mixing engine 102 to the broadcast engine 106, or vise versa. During such process, the conference manager 110 keeps any changes in the configurations transparent to the rest of the first and/or second groups of participants at the conference call.

Figure 3:
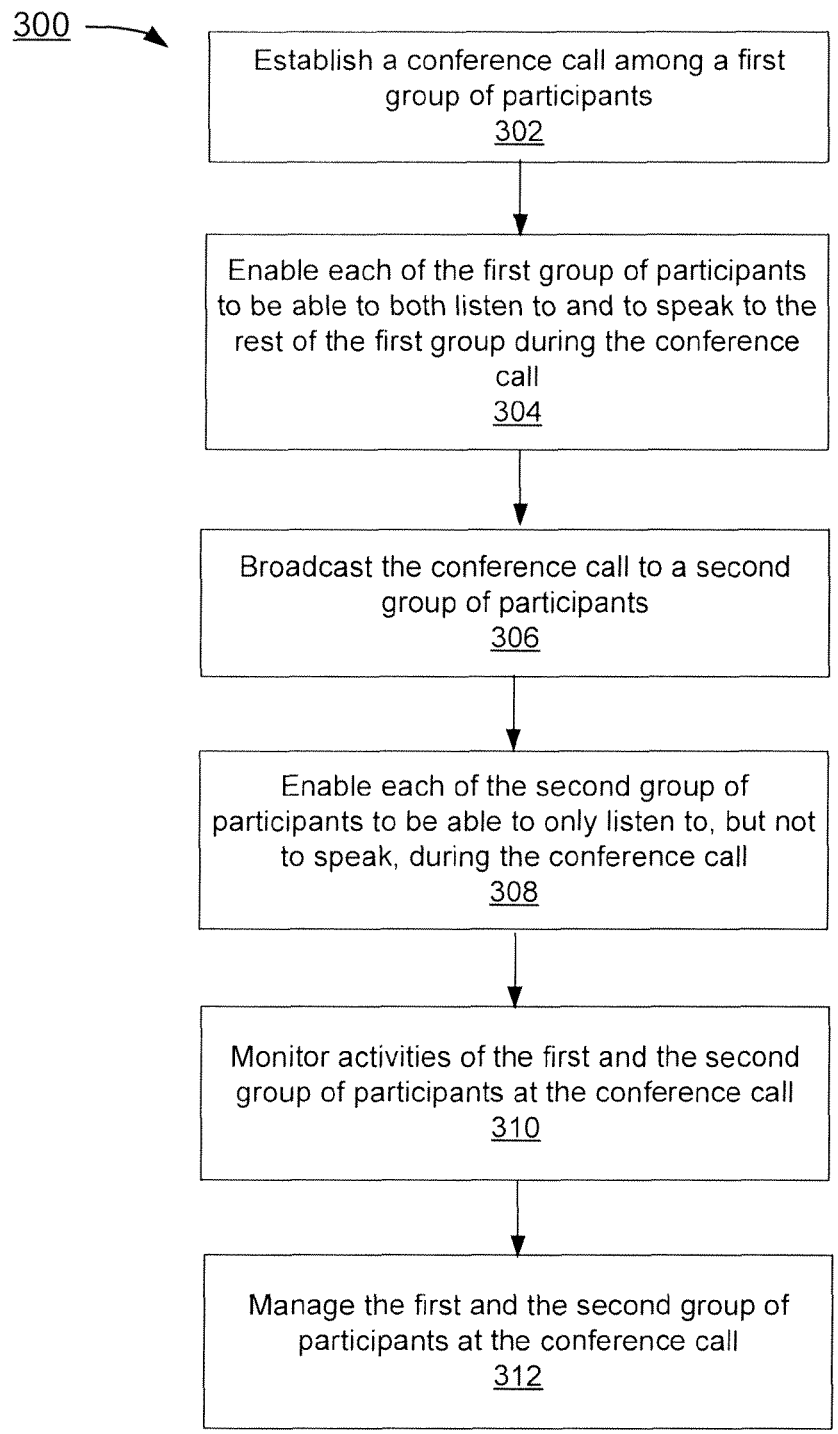
FIG. 3 depicts a flowchart of an example of a process to support dynamic conference call configuration and management.

FIG. 3 depicts a flowchart of an example of a process to support dynamic conference call configuration and management. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where a conference call among a first group of participants. The flowchart 300 continues to block 304 where each of the first group of participants is enabled to be able to both listen to and to speak to the rest of the first group during the conference call. The flowchart 300 continues to block 306 where the conference call is broadcasted to a second group of participants. The flowchart 300 continues to block 308 where each of the second group of participants is enabled to be able to only listen to, but not to speak, during the conference call. The flowchart 300 continues to block 310 where activities of the first and the second group of participants at the conference call are monitored. The flowchart 300 ends at block 312 where the first and the second group of participants at the conference call are managed and adjusted accordingly by adding, removing, or moving the participants of the first and the second groups.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
   a mixing engine, which in operation, establishes a conference call among a first group of participants, wherein each of the first group of participants is able to both listen to and to speak to the rest of the participants in the first group during the conference call;
   a broadcast engine, which in operation, connects to the mixing engine as one of the first group of participants; broadcasts the conference call to a second group of participants, wherein each of the second group of participants is only able to listen to, but not to speak, during the conference call; and
   a conference manager, which in operation, monitors activities of the conference call at the mixing engine and the broadcast engine; accepts and processes a request to dynamically adjust configuration of at least one of the first and the second group of participants; and, in response to the request, adjusts the first and the second group of participants associated with the mixing engine and the broadcast engine, respectively.

2. The system of claim 1, wherein: each participant in the first and/or second group of participants represents a gathering location at which a group of people are able to participate in the conference call.

3. The system of claim 1, wherein: the mixing engine connects to one or more other mixing engines, wherein each of the one or more other mixing engines enables a group of participants to listen to and to speak during the conference call.

4. The system of claim 1, wherein: the mixing engine connects to more than one broadcast engines, wherein each of the broadcast engines enables a group of participants to listen to the conference call.

5. The system of claim 1, wherein: the broadcast engine connects to one or more other broadcast engines, wherein each of the broadcast engines enables a group of participants to listen to the conference call.

6. The system of claim 1, wherein: the conference manager enables a participant to join the conference call at either the mixing engine or the broadcast engine by dialing in or accessing a client application.

7. The system of claim 1, wherein: the conference manager accepts and processes the request to dynamically adjust configuration of at least one of the first and the second group of participants by performing at least one of: adding a new participant to the first group of participants who are able to both listen to and speak at the conference call; removing an existing participant from the first group of participants at the conference call; moving a participant in the second group of participants to the first group of participants so that the participant is able to both listen to and speak at the conference call; moving a participant in the first group of participants to the second group of participants so that the participant is only able to listen to, but not to speak at the conference call; adding a new participant to the second group of participants who are only able to both listen to the conference call; removing an existing participant from the second group of participants at the conference call.

8. The system of claim 1, wherein: the conference manager sets a capacity of the mixing engine as the maximum number of the first group of participants who are able to both listen to and speak at the conference call.

9. The system of claim 8, wherein: the conference manager adds a new participant to join the conference call if the number of the first group of participants is less than the capacity of the mixing engine.

10. The system of claim 8, wherein: the conference manager moves a participant in the second group of participants from the broadcast engine to join the conference call at the mixing engine if the number of the first group of participants is less than the capacity of the mixing engine.

11. The system of claim 8, wherein: the conference manager removes a participant in the first group of participants at the mixing engine from the conference call under a set of scenarios.

12. The system of claim 11, wherein: the set of scenarios includes: a new participant needs to join the conference call when the capacity of the mixing engine is reached, the participant no longer participates in the conference call, and the participant behaves improperly during the conference call.

13. The system of claim 11, wherein: the conference manager automatically selects the participant in the first group of participants to be removed based on one or more of: priority of each of the first group of participants at the conference call, duration of each of the first group of participants at the conference call, frequency and duration of each of the first group of participants speaking at the conference call, and duration of silence since each of the first group of participants last spoke at the conference call.

14. The system of claim 11, wherein: the conference manager interacts with the first group of participants at the mixing engine when one of them needs to be removed and collects responses back from them.

15. The system of claim 14, wherein: the conference manager removes the participant from the first group of participants who voluntarily restrains from speaking at the conference call.

16. The system of claim 14, wherein: the conference manager removes the participant from the first group of participants based on feedbacks from the rest of the first group of participants.

17. The system of claim 1, wherein: the conference manager sets a capacity of the broadcast engine as the maximum number of the second group of participants that are able to listen to the conference call.

18. The system of claim 17, wherein: the capacity of broadcast engine is multiple times larger than the capacity of the mixing engine.

19. The system of claim 17, wherein: the conference manager adds a new participants to listen to, but not to speak at, the conference call if the number of the second group of participants is less than the capacity of the broadcast engine.

20. The system of claim 17, wherein: the conference manager move a participant in the first group of participants from the mixing engine to listen to the conference call only at the broadcast engine if the number of the second group of participants is less than the capacity of the broadcast engine.

21. A computer-implemented method, comprising:
establishing a conference call among a first group of participants;
enabling each of the first group of participants to be able to both listen to and to speak to the rest of the first group during the conference call;
broadcasting the conference call to a second group of participants;
enabling each of the second group of participants to be able to only listen to, but not to speak, during the conference call;
monitoring activities of the first and the second group of participants at the conference call;
accepting and processing a request to dynamically adjust configuration of at least one of the first and the second group of participants; and
in response to the request, adjusting the first and the second group of participants at the conference call.

22. The method of claim 21, further comprising: expanding the first group of participants who are able to both listen to and speak at the conference call.

23. The method of claim 21, further comprising: expanding the second group of participants who are able to only listen to, but not to speak at the conference call.

24. The method of claim 21, further comprising: enabling a participant to join the conference call to both listen to and speak to the conference call or only listen to the conference call by dialing in or accessing a client application.

25. The method of claim 21, further comprising: accepting and processing a request to add or remove a participant from the first or second group of participants at the conference call.

26. The method of claim 21, further comprising: setting a capacity on the maximum number of the first group of participants that are able to both listen to and speak at the conference call.

27. The method of claim 26, further comprising: adding a new participant to join the first group of participants who can both listen to and speak at the conference call if the number of the first group of participants is less than the capacity.

28. The method of claim 26, further comprising: moving a participant in the second group of participants to the first group of participants who can both listen to and speak at the conference call if the number of the first group of participants is less than the capacity.

29. The method of claim 26, further comprising: removing a participant in the first group of participants at the mixing engine from the conference call under a set of scenarios.

30. The method of claim 29, further comprising: selecting the participant in the first group of participants to be removed automatically based on one or more of priority of each of the first group of participants at the conference call, duration of each of the first group of participants at the conference call, frequency and duration of each of the first group of participants speaking at the conference call, and duration of silence since each of the first group of participants last spoke at the conference call.

31. The method of claim 29, further comprising: interacting with the first group of participants when one of them needs to be removed and collects responses back from them.

32. The method of claim 31, further comprising: removing the participant from the first group of participants who voluntarily restrains from speaking at the conference call.

33. The method of claim 31, further comprising: removing the participant from the first group of participants based on feedbacks from the rest of the first group of participants.

34. The method of claim 21, further comprising: setting a capacity of the maximum number of the second group of participants that are able to listen to the conference call.

35. The method of claim 34, further comprising: adding a new participant to listen to, but not to speak at, the conference call if the number of the second group of participants is less than the capacity.

36. The method of claim 34, further comprising: moving a participant in the first group of participants to the second group of participants so the participant is only able to listen to the conference call if the number of the second group of participants is less than the capacity.

37. A system, comprising:
   means for establishing a conference call among a first group of participants;
   means for enabling each of the first group of participants to be able to both listen to and to speak to the rest of the first group during the conference call;
   means for broadcasting the conference call to a second group of participants;
   means for enabling each of the second group of participants to be able to only listen to, but not to speak, during the conference call;
   means for monitoring activities of the first and the second group of participants at the conference call;
   means for accepting and processing a request to dynamically adjust configuration of at least one of the first and the second group of participants; and
   means for adjusting the first and the second group of participants at the conference call in response to the request.

38. A non-transitory machine readable medium having software instructions stored thereon that when executed cause a system to:
   establish a conference call among a first group of participants;
   enable each of the first group of participants to be able to both listen to and to speak to the rest of the first group during the conference call;
   broadcast the conference call to a second group of participants;
   enable each of the second group of participants to be able to only listen to, but not to speak, during the conference call;
   monitor activities of the first and the second group of participants at the conference call;
   accept and process a request to dynamically adjust configuration of at least one of the first and the second group of participants; and
   adjust the first and the second group of participants at the conference call.

* * * * *